United States Patent
Frommelt et al.

[15] 3,638,667
[45] Feb. 1, 1972

[54] LOADING DOCK SHELTERS

[72] Inventors: Cyril P. Frommelt; Sylvan J. Frommelt, both of Dubuque, Iowa

[73] Assignee: Dubuque Awning & Tent Company, Dubuque, Iowa

[22] Filed: May 5, 1970

[21] Appl. No.: 34,793

[52] U.S. Cl. ........................................................... 135/5 A
[51] Int. Cl. ............................................................ E04f 13/00
[58] Field of Search ................. 135/5 A, 5 R; 160/82; 52/204

[56] References Cited

UNITED STATES PATENTS

| | | | |
|---|---|---|---|
| 160,973 | 3/1875 | Trumper | 160/82 |
| 2,892,463 | 6/1959 | Frommelt et al | 160/82 X |
| 3,216,433 | 11/1964 | D'Azzo | 135/5 A |
| 3,322,132 | 5/1967 | Rieder et al | 135/5 A |

*Primary Examiner*—Peter M. Caun
*Attorney*—Johnston, Root, O'Keeffe, Keil, Thompson & Shurtleff

[57] ABSTRACT

An extensible loading dock shelter having side curtains which are pulled into draping engagement with the sides of a truck retracting the shelter.

7 Claims, 7 Drawing Figures

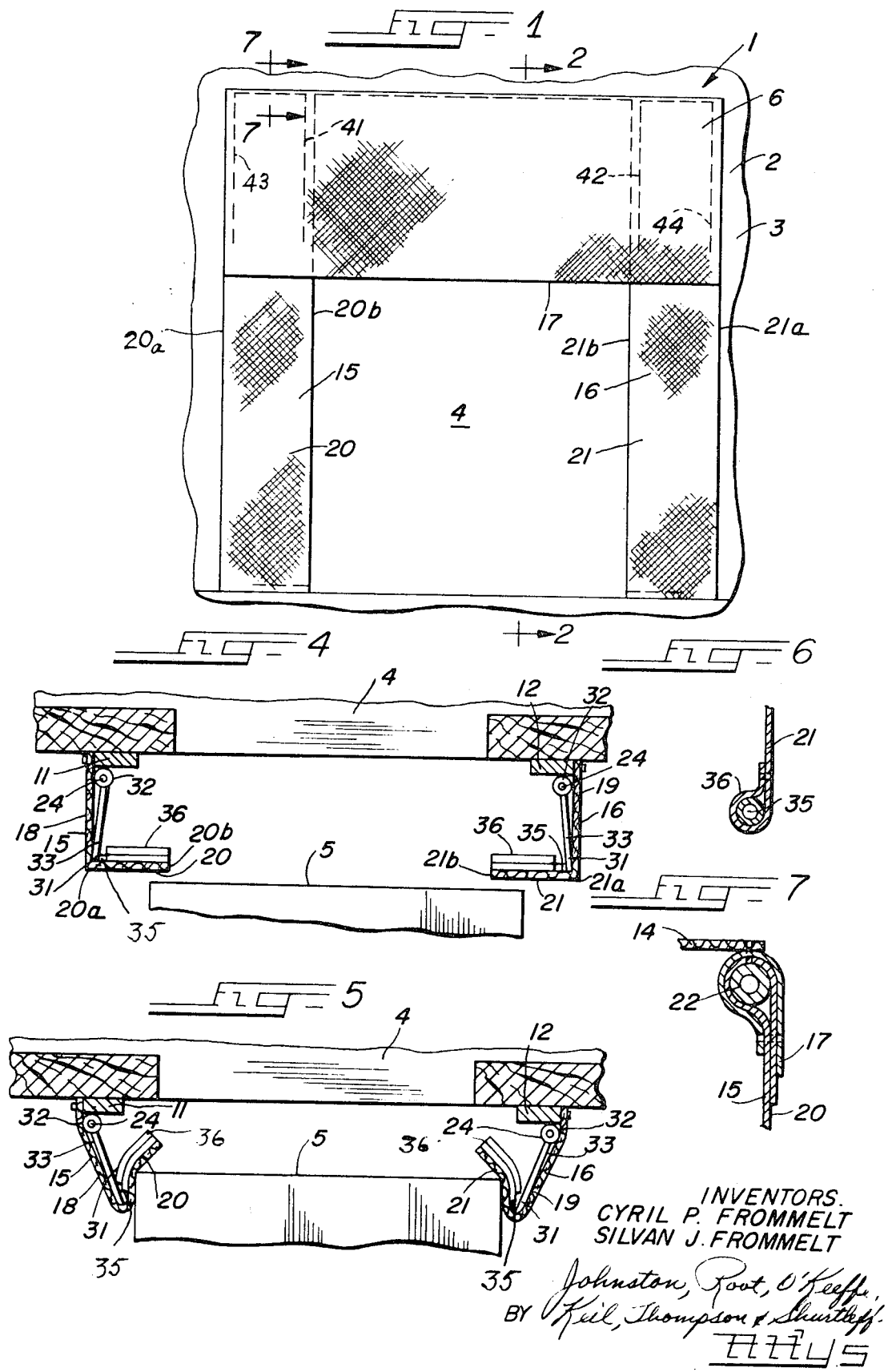

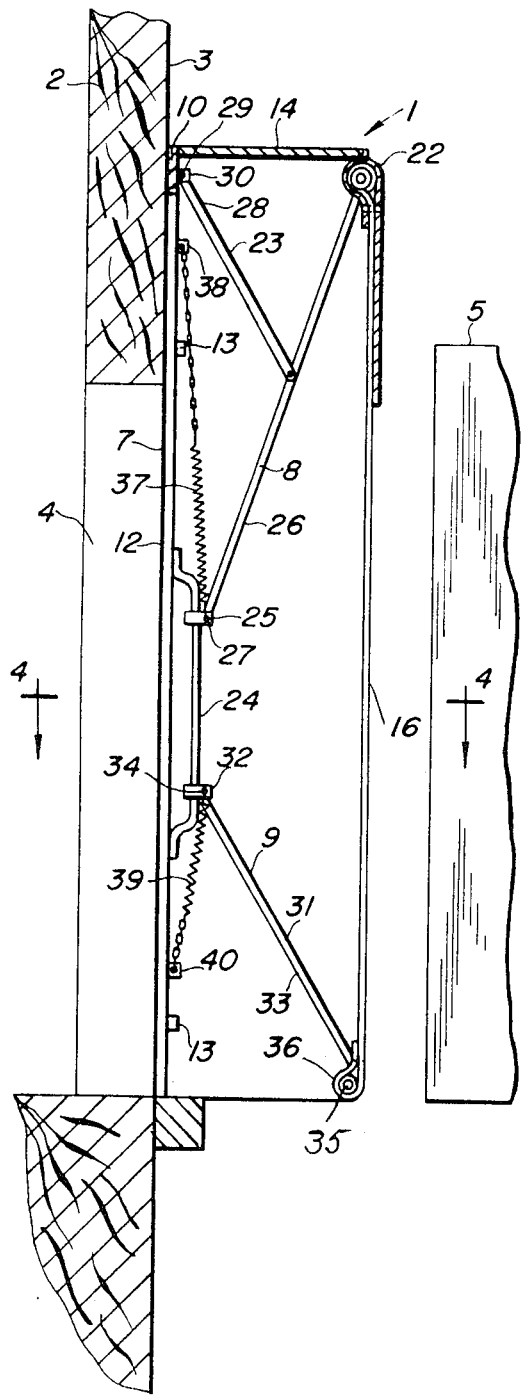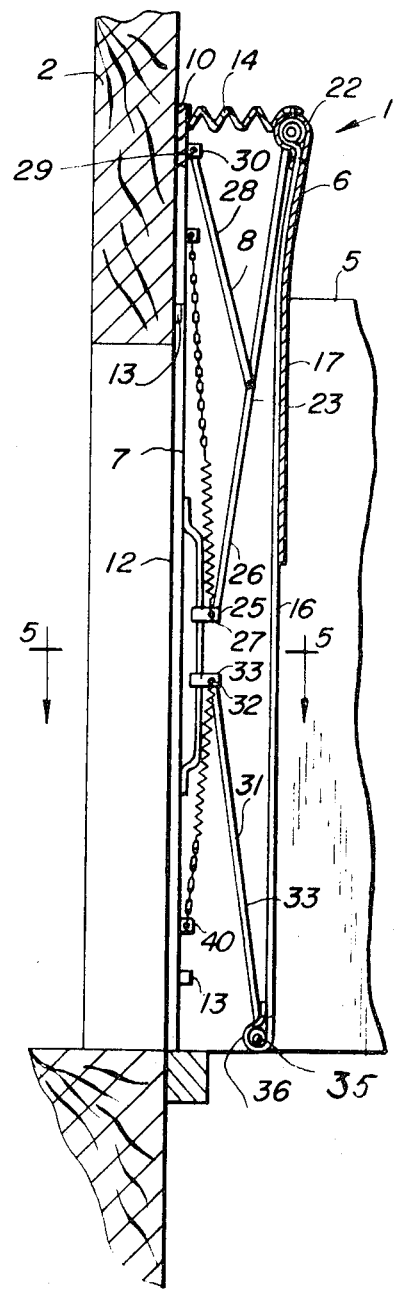

LOADING DOCK SHELTERS

BACKGROUND OF THE INVENTION

This invention relates to loading dock shelters, and, more particularly, to such shelters that are particularly well adapted for use as truck dock shelters.

It is a primary object of the present invention to afford a novel loading dock shelter.

Another object of the present invention is to afford a novel loading dock shelter of the extensible type.

Loading dock shelters of the extensible type, such as, for example, loading dock shelters of the type shown in our U.S. Letters Pat. No. 2,892,463 have been heretofore known in the art. Shelters of the type disclosed in the aforementioned U.S. Pat. No. 2,892,463 embody cover members which drape around a truck, or the like, in sealing engagement therewith. Such loading dock shelters have been highly successful and afford effective shelter for men and materials during the loading and unloading of a truck, or the like, through a warehouse doorway equipped with such a shelter. These shelters afford effective automatic sealing engagement between the shelters and the truck operatively engaged therewith.

It is an important object of the present invention to afford improvements over extensible loading dock shelters heretofore known in the art, such as, for example, the shelters of the type disclosed in the aforementioned U.S. Pat. No. 2,892,463.

Another object of the present invention is to afford a novel loading dock shelter wherein side curtains, embodied therein, are pulled in a positive manner into effective sealing engagement with the sides of a truck operatively engaging the shelter.

Another object is to afford a novel loading dock shelter of the aforementioned type which can be quickly and easily mounted on and removed from a warehouse wall, or the like.

Yet another object is to afford a novel extensible loading dock shelter which embodies a cover member constituted and arranged in a novel and expeditious manner.

A further object of the present invention is to afford a novel loading dock shelter of the type wherein a cover member is supported by spaced upper and lower supporting members of the retractable and extensible toggle joint type effective to yieldingly urge the cover toward extended position at all times, and wherein the parts of the shelter are so constituted and arranged that the sidewalls of the cover are effectively pulled in a novel and expeditious manner into firm sealing engagement throughout their length with the sides of a truck, when the truck moves into operative engagement with the shelter.

Another object of the present invention is to afford a novel loading dock shelter of the aforementioned type which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

SUMMARY OF THE INVENTION

The present invention affords a novel extensible loading dock shelter particularly well adapted for use as a truck dock shelter, and embodying a cover having a head curtain for extending across the top of a warehouse doorway, or the like, and two side curtains for extending along respective opposite sides of the doorway, with the cover carried by yieldable supporting means and the head curtain and side curtains so secured together in such a manner that operable engagement of a truck with the shelter is effective to pull the side curtains in a positive manner into sealing engagement with the sides of the truck.

DESCRIPTION OF THE DRAWINGS

In the drawings:

FIG. 1 is a front elevational view of a loading dock shelter embodying the principles of the present invention, with the shelter shown mounted in operative position around the doorway of a warehouse;

FIG. 2 is a sectional view taken substantially along the line 2—2 in FIG. 1;

FIG. 3 is a sectional view, similar to FIG. 2, but showing the parts thereof disposed in different operative positions;

FIG. 4 is a sectional view taken substantially along the line 4—4 in FIG. 2;

FIG. 5 is a sectional view, similar to FIG. 4, but taken substantially along the line 5—5 in FIG. 3;

FIG. 6 is an enlarged, fragmentary, detail sectional view taken substantially along the line 6—6 in FIG. 4; and FIG. 7 is an enlarged, fragmentary, detail sectional view taken substantially along the line 7—7 in FIG. 1.

DESCRIPTION OF THE EMBODIMENT SHOWN HEREIN

A loading dock shelter 1 embodying the principles of the present invention is shown in the drawings to illustrate the presently preferred embodiment of the present invention. It is shown mounted on an outer wall 2 of a warehouse 3 in surrounding relation to a doorway 4 in the warehouse wall 2, FIG. 1. As will be discussed in greater detail presently, the shelter 1 is operable to afford an effective shelter between a truck 5, FIGS. 2–5, and the doorway 4, when, as shown in FIGS. 3 and 5, the truck 5 is disposed in normal operative position relative to the doorway 4 for loading and unloading operations to be effected through the doorway 4 and the rear end of the truck 5.

The loading dock shelter 1 embodies, in general, a cover 6 supported from a supporting frame 7 by an upper supporting unit 8 and a lower supporting unit 9, which units are preferably vertically spaced from each other. In operation, the shelter 1 is mounted on the warehouse 3 in such position that the cover 6 is disposed around the doorway 4 and normally projects outwardly from the wall 2 in position to be operatively engaged by a truck, such as the truck 5, as will be discussed in greater detail presently.

The supporting frame 7 may be made of any suitable material such as, for example, wood, and embodies a substantially horizontally extending top rail or crossbar 10, FIGS. 2 and 3, and two substantially vertically extending side rails 11 and 12, FIGS. 4 and 5. The side rails 11 and 12 are secured at their upper ends to respective opposite ends of the crossbar 10 and project downwardly therefrom. In operation, the frame 7 is secured to the outer face of the warehouse wall 2 by suitable means such as bolts 13, FIGS. 2 and 3, in such position that the crossbar 10 extends across the doorway 4 in upwardly spaced relation thereto, and the side rails 11 and 12 extend along respective opposite sides of the doorway 4 in outwardly spaced relation thereto.

The cover 6, which is mounted on the supporting frame 7 in position to be extended outwardly therefrom, embodies an elongated top wall 14, FIGS. 2 and 3, two elongated side curtains 15 and 16, FIGS. 1, 4 and 5, extending downwardly from respective opposite ends of the top wall 14, and a head curtain 17, FIGS. 1–3, depending from the top wall 14. The side curtains 15 and 16 embody elongated sidewalls or side panels 18 and 19, respectively, extending forwardly from the supporting frame 7, and elongated front walls or front panels 20 and 21, FIGS. 4 and 5, having outer longitudinal edges 20a and 21a attached to and extending along the front longitudinal edges of the side panels 18 and 19, respectively, the front panels 20 and 21 extending inwardly toward each other from the side panels 18 and 19, and terminating in spaced relation to each other along longitudinal inner edges 20b and 21b respectively. The side curtains 15 and 16 and the head curtain 17 may be made of any suitable material, but preferably they are made from a water repellent, wear resistant, flexible material, such as, for example, canvas duck or rubber-impregnated nylon fabric.

It will be observed that the cover 6 is of a type which may be termed a "drape type." That is, it embodies walls and curtains which consist of fabric or sheet material supported in more or less a tentlike manner as distinguished from fabric or sheet material affording the casing of a pad or pillow, or the like.

The supporting frame 7 is disposed at the rear of the loading dock shelter 1, and the rear longitudinal edges of the walls 14, 18 and 19 are secured to the rails 10–12, respectively, by suitable means such as nails or screws, not shown. The sidewalls 18 and 19 are secured along their upper ends to the respective opposite ends of the top wall 14 by suitable means, such as sewing, and the head curtain 17 and the front walls 20 and 21 are similarly secured along their upper edges to the front longitudinal edge of the top wall 14. The front walls 20 and 21 are similarly secured along their outer longitudinal edges 20a and 21a to the front longitudinal edges of the sidewalls 18 and 19, respectively.

The upper supporting unit 8 of the preferred form of the loading dock shelter 1 shown in the drawings is of the general type disclosed in our aforementioned U.S. Letters Pat. No. 2,892,463. It embodies an elongated frame member 22, FIGS. 2, 3 and 7, disposed within the cover 6 and secured thereto along the junction of the top wall 14 with the head curtain 17 and the front walls 20 and 21. The frame member 22 preferably extends the full length of the top wall 14, and is supported at its opposite ends by suitable retractable, automatically extending, supporting mechanisms 23 disposed at respective opposite sides of the doorway 4. The supporting mechanisms 23 are identical in construction and operation, and only one such mechanism is shown in the drawings, FIGS. 2 and 3, that being sufficient for an understanding thereof by those skilled in the art.

The supporting mechanism 23 mounted at the right side of the doorway 4, as viewed in FIG. 1, includes an elongated supporting member or mounting member in the form of an elongated bar 24, FIGS. 2 and 3, which is round in transverse cross section and secured to the front face of the side rail 12 of the supporting frame 7 in longitudinally extending relation thereto. A slide member 25 is mounted on the bar 24 for reciprocation longitudinally thereof, and projects forwardly therefrom. The lower end of an arm or lever 26 is pivotally secured to the front end portion of the slide member 25 by suitable means such as a pin or bolt 27, FIGS. 2 and 3. The upper end of the arm 26 is secured to the frame member 22. The lower end of another arm or lever 28 is pivotally secured to the arm 26, intermediate the ends of the latter, and the upper end of the arm 28 is pivotally secured by a pin or bolt to an arm or bar in the form of a bracket 30 stationarily secured to the upper end portion of the slide rail 12 and projecting forwardly therefrom. It will be understood that the upper supporting mechanism 23 at the other side of the doorway 4 is similarly mounted on the side rail 11 of the supporting frame 9.

Similarly, the lower supporting unit 9 of the preferred form of loading dock shelter 1 shown in the drawings is of the same general type as that disclosed in our aforementioned U.S. Pat. No. 2,892,463. It includes retractable, automatically extending, supporting mechanisms 31 disposed at respective opposite sides of the doorway 4, FIGS. 4 and 5. The supporting mechanisms 31 are identical in construction and operation.

As may best be seen in FIGS. 2 and 3, the supporting mechanism 31 mounted at the right side of the doorway 4, as viewed in FIG. 1, includes the aforementioned elongated bar 24 mounted on the front face of the side rail 12 of the supporting frame 7. A slide member 32 is rotatably and slidably mounted on the bar 24 for rotation transversely thereof and reciprocation longitudinally thereof. The slide member 32 projects forwardly therefrom from the bar 24, and the upper end of another arm or lever 33 is pivotally secured to the front end of the slide member 32 by suitable means such as a pin or bolt 34, the arm 33 projecting downwardly and forwardly from the frame side member 12. Another elongated arm 35, preferably in the form of a resilient, elongated leaf spring or coil spring, which is flexible transversely to its length, has one end secured to the lower end of the arm 33, and the other end portion thereof is disposed in a hem 36 formed in the lower edge of the front wall 21 of the cover 6 position to yieldingly urge the lower edge portion of the front wall 21 toward flat condition. The arm 35 and the hem 36 preferably are so disposed on the front wall 21 that, when the cover 6 is in normal fully extended position, as shown in FIGS. 1 and 2, the arm 35 projects substantially horizontally from the attached arm 33 toward the front wall 20 in parallel, forwardly spaced relation to the doorway 4. It will be understood that the lower supporting mechanism 31 at the other side of the doorway 4 is similarly mounted on the side rail 11 of the supporting frame 7 and similarly secured to the front wall 20 of the cover 6.

As will be appreciated by those skilled in the art, the upper supporting mechanisms 23 embody a toggle joint afforded by the arms 26 and 28, and another toggle joint afforded by the arm 26 and the slide member 25; and the lower supporting mechanisms 31 embody a toggle joint afforded by the arm 31 and the slide member 32, FIG. 2. Each of the upper supporting mechanisms 23 embodies a coil spring 37 secured to the supporting frame 7 by suitable means such as a bracket 38 mounted on the respective one of the side rails 11 and 12, and has its lower end secured to the arm 26 in position to continuously urge the slide member 25 thereof upwardly along the bar 24 and thereby continuously afford an expanding force on the toggle joint afforded by the members 26 and 28 and on the toggle joint afforded by the members 25 and 26. The expanding force thus applied to each of the toggle joints in the supporting mechanisms 23 is effective to cause each of them to urge the cover 6 outwardly away from the supporting frame 9.

Similarly, in each of the lower supporting mechanisms 31, a tension coil spring 39 has its lower end connected to the supporting frame 9 by suitable means such as a bracket 40 secured to the respective one of the side rails 11 and 12, and has its upper end secured to the arm 33 in position to continuously urge the slide members 32 downwardly along the respective rods 24 and thereby continuously afford an expanding force on the toggle joints afforded by the pairs of members 32 and 33. This expanding force thus applied to each of the toggle joints in the supporting mechanisms 31 is effective to cause each of them to urge the cover 6 outwardly away from the frame 7.

In the preferred form of the invention shown in the drawings the slide members 25 and 32 of the upper and lower supporting mechanisms 23 and 31 disposed on the same side of the doorway 4 are shown mounted on the same supporting bar 24. However, as will be appreciated by those skilled in the art, this is merely by way of illustration and not by way of limitation, and individual supporting bars may be afforded for the slide members 25 and 32 without departing from the purview of the present invention.

It will be seen that with the loading dock shelter 1 constructed in the manner shown herein, the upper supporting unit 8 and the lower supporting unit 9 not only afford an effective support for the cover 6, but also apply a strong, but yieldable, extending force thereto to thereby continuously urge the cover 6 into fully extended position and then continue to afford an extending force on it. Also, it will be seen that the springs 39 in the lower supporting mechanisms 31 yieldingly urge the arms 33 toward the substantially directly outwardly projecting relation to the warehouse 3 shown in FIGS. 2 and 4, and yieldingly hold the arms 33 against rotation on the arms 24 into more closely overlying relation to the doorway 4, such as shown in FIGS. 3 and 5.

Preferably, the cover member 17 is of such length that it extends the full distance between the outer longitudinal edges 20a and 21a of the front panels 20 and 21 of the side curtains 15 and 16, respectively, when the cover 1 is disposed in fully extended position. Also, it will be observed that in the preferred form of the invention shown in the drawings, the head curtain 17 is disposed in outwardly overlying relation to the front faces of the front panels 20 and 21. However, as will be appreciated by those skilled in the art, this is merely by way of illustration, and not by way of limitation, and, if desired, the head curtain 17 may be disposed in underlying relation to the rear faces of the front panels 20 and 21 without departing from the purview of the broader aspects of the present invention.

In the loading dock shelter 1, the head curtain 17 is secured to the front panels 20 and 21 of the side curtains 15 and 16, respectively, by suitable means such as stitching, along lines 41 and 42, FIG. 1, extending longitudinally of the front panels 20 and 21 in closely adjacent relation to the inner longitudinal edge portions 20b and 21b thereof, respectively. The lines 41 and 42 preferably terminate at their upper ends at the upper edge of the head curtain 17, and at their lower ends in slightly upwardly spaced relation to the lower edge of the head curtain 17, for a reason which will be discussed in greater detail presently. With this construction, when the loading dock shelter 1 is in extended position, and is engaged by a truck, such as the truck 5, backing thereagainst in normal operative position, wherein the truck 5 is disposed between the upper supporting mechanisms 23 and the lower supporting mechanisms 31 disposed on opposite sides of the doorway 4, the head curtain 17 is pushed rearwardly, such as, for example, from the fully extended position shown in FIG. 2 to the partially retracted position shown in FIG. 3. Such rearward movement of the head curtain 17 pulls inwardly and rearwardly on the inner edge portions of the front panels 20 and 21 of the side curtains 15 and 16, respectively, and thereby affords an inward pulling force on the front longitudinal edge portions of the side panels 18 and 19 of the side curtains 15 and 16. This force applied to the side curtains 15 and 16 is effective to rotate the arms 33 of the lower supporting unit 9 on the respective rods 24 on which they are mounted from the normally substantially directly outwardly extending relation, as shown in FIG. 4, to a position wherein they are swung inwardly on the rods 24 into more closely overlying relation to the doorway 4, as shown in FIG. 5.

When a truck, such as the truck 5, is disposed in normal operative engagement with the loading dock shelter 1, it engages both the head curtain 17 and the side curtains 15 and 16 between the supporting mechanisms therefor disposed at opposite sides of the doorway 4, as illustrated in FIGS. 4 and 5. Such engagement of the truck 5 with the loading dock shelter 1, by reason of the flexible nature of the curtains 15–17, is effective to cause the head curtain 17 to drape itself across the top of the truck 5, and to cause the side curtains 15 and 16 to drape themselves across the respective adjacent sides of the truck 5. However, in addition, with the loading dock shelter 1 constructed in the manner shown herein, this engagement of the truck 5 with the curtains 15–17 is effective to pull the arms 33 of the lower supporting unit 9 around the rods 24 on which they are mounted inwardly toward the doorway 4 and thereby press the lower edge portions of the front walls 20 and 21 and the front longitudinal edges of the sidewalls 18 and 19 of the side curtains 15 and 16, respectively, into tight engagement with the respective adjacent sidewalls of the truck 5, as illustrated in FIG. 5. This movement of the arms 33, together with the pull afforded by the head curtain 17 on the side curtains 15 and 16 is effective to pull the front walls 20 and 21 and the longitudinal edges of the sidewalls 18 and 19 into tight sealing engagement with the adjacent respective sidewalls of the truck 5, substantially throughout the length of the side curtains 15 and 16 between the lower ends of the latter and the lower edge of the head curtain 17.

Thus, it will be seen that with the loading dock shelter 1 constructed in the manner shown herein, when a truck is moved into operative engagement therewith, the curtains 15–17 are not only disposed in draped relation thereto, but the side curtains 15 and 16 are pulled, in a positive manner, into draped, sealing engagement with the adjacent sides of the truck.

In the preferred form of loading dock shelter 1 shown in the drawings, the head curtain 17 is secured, by suitable means such as stitching, along two additional lines 43 and 44 to the front panels 20 and 21 of the side curtains 15 and 16, respectively, FIG. 1. In the cover 6, the lines 43 and 44 are disposed closely adjacent to the outer longitudinal edges 20a and 21a of the front walls 20 and 21, respectively, in parallel relation to the lines 41 and 42, and extend downwardly from the top edge of the head curtain 17 the same distance as the lines 41 and 42. Primarily, the securing of the head curtain 17 to the front walls 20 and 21 along the lines 43 and 44 is for the purpose of relieving some of the strain on the securing thereof along the lines 41 and 42. If the head curtain 17 were to be secured to the side curtains 15 and 16 in one area only, in order to afford the aforementioned pulling force thereon, this preferably would be accomplished in closely adjacent relation to the inner longitudinal edges 20b and 21b of the front panels 20 and 21 so as to afford a pulling force across substantially the full widths of the front panels 20 and 21 effective to urge these panels into tight sealing engagement with the adjacent sidewall portions of the truck 5. However, as will be appreciated by those skilled in the art, such securing of the head curtain 17 to the front panels 20 and 21 in closely adjacent relation to the longitudinal edge portions 20b and 21b thereof is merely by way of illustration of the preferred form of the present invention, and not by way of limitation, and if desired, the head curtain 17 may be secured to other portions of the side curtains 15 and 16 without departing from the purview of the broader aspects of the present invention.

Warehouse doorways of the type involved herein, are commonly of substantial size, such as, for example, being 10 to 12 feet in width and height, and in the preferred form of the present invention, the loading dock shelter 1 is of such size that it will completely surround the top and sides of such a doorway. The head curtains of such a loading shelter, such as the head curtain 17, may be of various widths, depending on various factors, such as, for example, the height of the trucks with which the unit is primarily intended to be used. Normally, the head curtain 17 preferably is of such a width that when a truck, such as the truck 5, backs into operative engagement therewith and moves the cover 6 from fully extended position, as shown in FIG. 2, to a retracted position, as shown in FIG. 3, with the head curtain 17 draped across the top of truck 5 in sealing engagement therewith, the lower edge of the head curtain 17 is disposed upwardly a sufficient distance that men and material can freely move through the doorway 4 into and out of the rear of the truck 5 beneath the head curtain 17. Thus, the head curtains 17 commonly have a width of from 36 to 60 inches, with a preferred width for most installations being in the nature of 48 inches.

It will be remembered that the lines 41–44 along which the head curtain 17 is secured to the front panels 20 and 21 preferably terminate in upwardly spaced relation to the lower edge of the head curtain 17. This is primarily for the purpose of insuring that the lower edge portion of the head curtain 17 is free to give, laterally, if it is engaged by a person or an article being moved into or out of the truck 5, and thus afford an additional safety factor for the amount of "head room" afforded for the free passage of men and materials into and out of the truck 5. Normally, with head curtains of the aforementioned sizes, the lines 41–44 preferably terminate a distance of from 6 to 12 inches from the lower edge of the curtain 17, and preferably in the order of 9 inches, depending upon the width of the head curtain 17 and the extent of head room desired to be afforded.

From the foregoing, it will be seen that the present invention affords a novel extensible loading dock shelter which is highly effective in sealingly engaging a truck, or the like, disposed in operative engagement therewith.

Also, it will be seen that the present invention affords a novel loading dock shelter wherein the parts thereof are constituted and arranged in a manner effective to afford a positive force for urging the loading dock shelter into tight sealing engagement with the sidewalls of a truck, or the like, disposed in operative engagement therewith.

In addition, it will be seen that the present invention affords a novel loading dock shelter which is practical and efficient in operation and which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. A loading dock shelter comprising
   a. a cover comprising
      1. a head curtain adapted to extend along the top of a door of a warehouse, and
      2. two side curtains adapted to extend along respective sides of said door,
   b. lever means connected to the upper portion of said head curtain and adapted to be mounted on said warehouse in position to move inwardly and outwardly relative to the latter for yieldingly holding said head curtain in outwardly extended relation to said warehouse,
   c. other lever means connected to the lower portion of said side curtains and adapted to be mounted on said warehouse for yieldingly holding the lower portion of said side curtains in outwardly extended relation to said warehouse, and
   d. means operatively connected to said other lever means for pivotally supporting said other lever means for rotation in a horizontal direction between
      1. an outwardly extending position, and
      2. another position wherein said other lever means are disposed in more closely overlying relation to said door,
   e. said head curtain, below said upper portion attached to said side curtains in operative position effective to swing said other lever means toward said other position upon movement of said head curtain with said first-mentioned lever means inwardly toward said warehouse.

2. A loading dock shelter ad defined in claim 1, and in which
   a. said first-mentioned lever means comprise toggle joint means connected to the upper portion of said head curtain and adapted to be connected to said warehouse.

3. A loading dock shelter as defined in claim 2, and in which
   a. said other lever means includes resilient, elongated, longitudinally flexible members extending across and connected to respective ones of said lower portions of said side curtains for yieldingly urging said lower portions toward flat condition.

4. An extensible loading dock shelter comprising
   a. a cover comprising
      1. a head curtain adapted to extend along the top of a doorway of a warehouse, and
      2. two side curtains adapted to extend along respective opposite sides of said doorway,
   b. means connected to the upper portion of said head curtain and adapted to be mounted on said warehouse for
      1. holding said cover for movement between a fully retracted position and a fully extended position relative to said warehouse, and
      2. yieldingly urging said cover toward said fully extended position,
   c. means connected to the lower portions of said side curtains and adapted to be mounted on said warehouse for holding said side curtains in extended position relative to said warehouse,
   d. said last-mentioned means comprising
      1. mounting means adapted to be mounted on said warehouse on said respective opposite sides of said doorway, and
      2. two elongated arms, each having
         a'. one end mounted on said mounting means at a respective one of said sides of said doorway and
         b'. another end attached to said lower end portion of a respective one of said side curtains,
   e. said other ends being movable with said lower end portions of said side curtains horizontally relative to said mounting means between
      1. an outer position wherein they are disposed outwardly relative to respective ones of said mounting means, and
      2. an inner position wherein they
         a'. are disposed closer to said warehouse than in said outer position, and
         b'. overly said doorway to a greater extent than in said outer position,
   f. said head curtain, below said upper portion, being operatively attached to said side curtains in position to pull said other ends and said lower end portions of said side curtains from said outer position toward said inner position upon movement of said head curtain toward said fully retracted position from a further extended position.

5. An extensible loading dock shelter as defined in claim 4, and in which
   a. said side curtains each comprise
      1. an elongated, flexible side panel
         a'. extending longitudinally along a respective one of said sides of said doorway, and
         b'. having
            1'. one longitudinal edge disposed adjacent to said warehouse, and
            2'. another longitudinal edge disposed in outwardly spaced relation to said warehouse when said cover is disposed in said fully extended position, and
      2. an elongated, flexible front panel having
         a'. one longitudinal edge secured to said other edge of said side panel in juxtaposition thereto, and
         b'. another longitudinal edge projecting inwardly toward said other side curtain, and
   b. said front panel of each of said side curtains is secured to said head curtain along a line extending longitudinally of said side curtain and disposed more closely adjacent to said other longitudinal edge of said front panel than to said one longitudinal edge thereof.

6. An extensible loading dock shelter as defined in claim 5, and in which
   a. said line terminates in upwardly spaced relation to the lower edge of said side curtain.

7. An extensible loading dock shelter as defined in claim 5, and in which
   a. each of said mounting means comprises an elongated bar adapted to be mounted in substantially vertically extending position on said respective side of said doorway,
   b. each of said arms comprises one member of a respective toggle joint,
   c. each of said toggle joints includes another member slidably mounted on a respective one of said bars for substantially vertical reciprocation therealong, and
   d. said means connected to the lower portion of said side curtains includes springs connected to said toggle joints and adapted to be connected to said warehouse for maintaining a yieldable extension force on said toggle joint and thereby maintain a yieldable force on said lower portions of said side curtains urging the latter toward said extended position.

* * * * *

PO-1050
(5/69)

UNITED STATES PATENT OFFICE
CERTIFICATE OF CORRECTION

Patent No. 3,638,667   Dated February 1, 1972

Inventor(s) CYRIL P. FROMMELT and SYLVAN J. FROMMELT

It is certified that error appears in the above-identified patent and that said Letters Patent are hereby corrected as shown below:

Column 7, line 39, "below said upper portion" should be followed by -- , being --.

Signed and sealed this 30th day of May 1972.

(SEAL)
Attest:

EDWARD M. FLETCHER, JR.
Attesting Officer

ROBERT GOTTSCHALK
Commissioner of Patents